US011366746B2

(12) United States Patent
Bragg, Jr. et al.

(10) Patent No.: US 11,366,746 B2
(45) Date of Patent: Jun. 21, 2022

(54) SYSTEM FOR APPLICATION CODE DEVELOPMENT BUILD, SCAN, AND TEST ENVIRONMENT

(71) Applicant: BANK OF AMERICA CORPORATION, Charlotte, NC (US)

(72) Inventors: Raymond B. Bragg, Jr., Jacksonville Beach, FL (US); Abhijit G. Kshirsagar, Jacksonville, FL (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 140 days.

(21) Appl. No.: 16/894,073

(22) Filed: Jun. 5, 2020

(65) Prior Publication Data
US 2021/0382812 A1   Dec. 9, 2021

(51) Int. Cl.
*G06F 11/36*   (2006.01)
*G06F 8/41*    (2018.01)

(52) U.S. Cl.
CPC ............ *G06F 11/3688* (2013.01); *G06F 8/44* (2013.01)

(58) Field of Classification Search
None
See application file for complete search history.

(56) References Cited

U.S. PATENT DOCUMENTS

| | | | |
|---|---|---|---|
| 7,797,697 B2 | 9/2010 | Woollen et al. | |
| 7,873,859 B2 | 1/2011 | Smith et al. | |
| 8,782,603 B2 * | 7/2014 | Plate | H04L 63/1433 717/121 |
| 11,163,675 B1 * | 11/2021 | Pearson | G06F 8/30 |
| 2009/0125891 A1 * | 5/2009 | Garimella | G06F 11/3612 717/131 |
| 2012/0222014 A1 * | 8/2012 | Peretz | G06F 11/3688 717/125 |
| 2017/0010901 A1 | 1/2017 | Parikh et al. | |
| 2018/0032322 A1 | 2/2018 | Jagannath et al. | |
| 2021/0124576 A1 * | 4/2021 | Gungabeesoon | G06F 11/3692 |
| 2021/0133091 A1 * | 5/2021 | Pillai | G06F 9/5077 |

OTHER PUBLICATIONS

Gu et al., "Capturing and Exploiting IDE Interactions," IEEE, 2014, 12pg. (Year: 2014).*
Röthlisberger et al., "Augmenting IDEs with Runtime Information for Software Maintenance," Universität Bern, 2010, 322pg. (Year: 2010).*

* cited by examiner

*Primary Examiner* — Ryan D. Coyer
(74) *Attorney, Agent, or Firm* — Moore & Van Allen PLLC; Jeffrey R. Gray

(57) ABSTRACT

A system for providing support in creating build code, scan code, and test code for source code based on stored application and program configurations. The configurations are set for the application and/or program for which the source code is developed, and the configurations indicate the various programs, applications, databases, third-party applications, or the like with which the source code may interface. During the build action, the system will create the build code to interface with various programs, applications, databases, third-party applications, or the like, and compile the code. During the scan action, the system will create the scan code to allow the source code to interface with the scanning application to check the quality of the code. During the test action the system will create the test code to allow execution within a test environment in which the code will operate.

20 Claims, 7 Drawing Sheets

SYSTEM FOR APPLICATION CODE DEVELOPMENT BUILD, SCAN, AND TEST ENVIRONMENT

FIELD

The present invention relates to a system for code development, and more particularly, to a system that provides support in the building, scanning, and testing of code for a program within an application.

BACKGROUND

In order to develop new code and/or update current code not only must a developer create the code, but the developer must also know how the code interacts with and/or communicates with other programs on the application, databases, third-party applications, or other various internal and external interfaces. This information often requires specific knowledge of the other programs, databases, third-party applications, and/or interfaces that often results in errors within the code. There is a need for an improved system for developing code.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Generally, systems, computer products, and methods are described herein for providing support (e.g., assisting, or the like) in creating build code, scan code, and test code for source code based on stored application and program configurations. The configurations are set for the application and/or program for which the source code is developed, and the configurations indicate the various programs, applications, databases, third-party applications, or the like with which the source code may interface. During the build action, the system will create the build code to interface with various programs, applications, databases, third-party applications, or the like, and compile the code. During the scan action, the system will create the scan code to allow the source code to interface with the scanning application to check the quality of the code. During the test action the system will create the test code to allow execution within a test environment in which the code will operate.

Embodiments of the invention comprise system, computer implemented methods, and computer program products for aiding in development of code. The invention comprises receiving a selection for a build action, a scan action, or a test action of the code for a program for an application. The build code is generated for the build action, the scan code is generated for the scan action, or the test code is generated for the test action based on pre-selected configurations and the selection of the build action, the scan action, or the test action. A notification of completion or error for the build action, the scan action, or the test action is sent (e.g., to the developer). The build code for the build action allows for communication of the code with the program and the application. The scan code for the scan action allows for a code quality scan of the code for potential code issues. The test code for the test action allows for execution of the code for testing.

In further accord with embodiments, the invention further comprises receiving a selection from a developer of the code for the build action, the scan action, or the test action.

In other embodiments of the invention, receiving the selection for the build action, the scan action, or the test action comprises receiving the selection for the build action, the scan action, and the test action.

In yet other embodiments of the invention, the pre-selected configurations are application configurations, and the invention further comprises receiving the application configurations for the code. The application configurations set global parameters for the code developed for the application.

In still other embodiments of the invention, the pre-selected configurations are program configurations for the program within the application, and the invention further comprises receiving the program configurations for the code. The program configurations set program parameters for the code developed for the program within the application.

In other embodiments of the invention, the pre-selected configurations are specific to each developer on the system.

In further accord with embodiments, the invention further comprises processing the build action by receiving the pre-selected configurations and generating the build code for the build action, and utilizing the build code to compile the code for preparation for execution.

In other embodiments, the invention further comprises processing the scan action by receiving the pre-selected configurations and generating the scan code for the scan action, and utilizing the scan code to automatically allow a scan system to perform the code quality scan on the code.

In yet other embodiments, the invention further comprises processing the test action by receiving the pre-selected configurations and generating the test code for the test action, and utilizing the test code to automatically execute the code in a testing environment.

In still other embodiments, the invention further comprises logging results of the build action, the scan action, or the test action.

In other embodiments, the log comprises a date, a time, an application identifier, a program identifier, a developer identifier, or an indication of completion or incompletion in the build action, the scan action, or the test action.

In further accord with embodiments, the invention further comprises receiving a selection to view a scan report, and providing the scan report to a developer on a developer computer system.

In other embodiments of the invention, the code is source code created by a developer, and the build code comprises at least the executable file for the source code.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
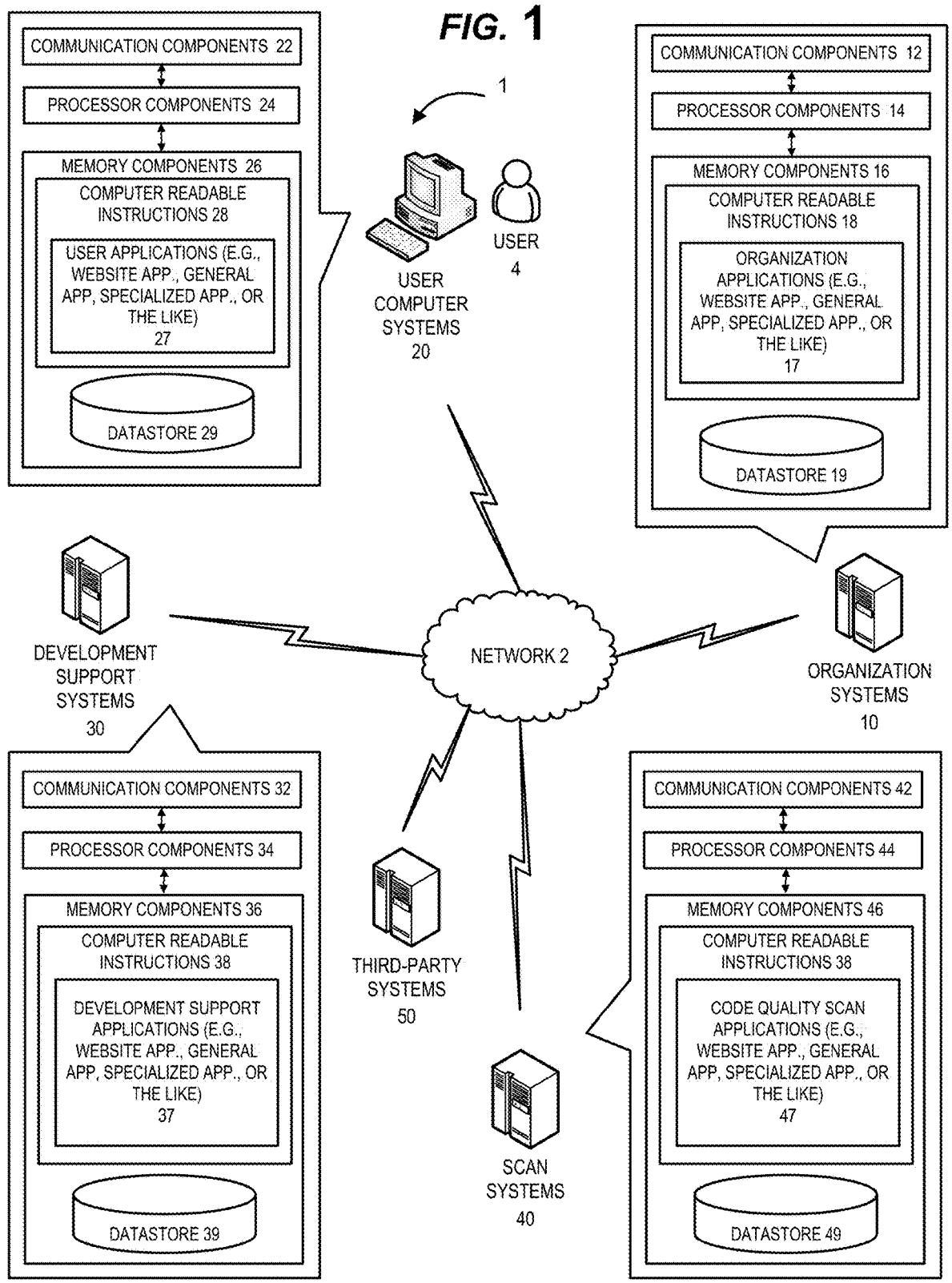

Having thus described embodiments of the invention in general terms, reference will now be made to the accompanying drawings, and wherein:

FIG. 1 illustrates a block system diagram of a code development system environment, in accordance with some embodiments of the present disclosure.

Figure 2:
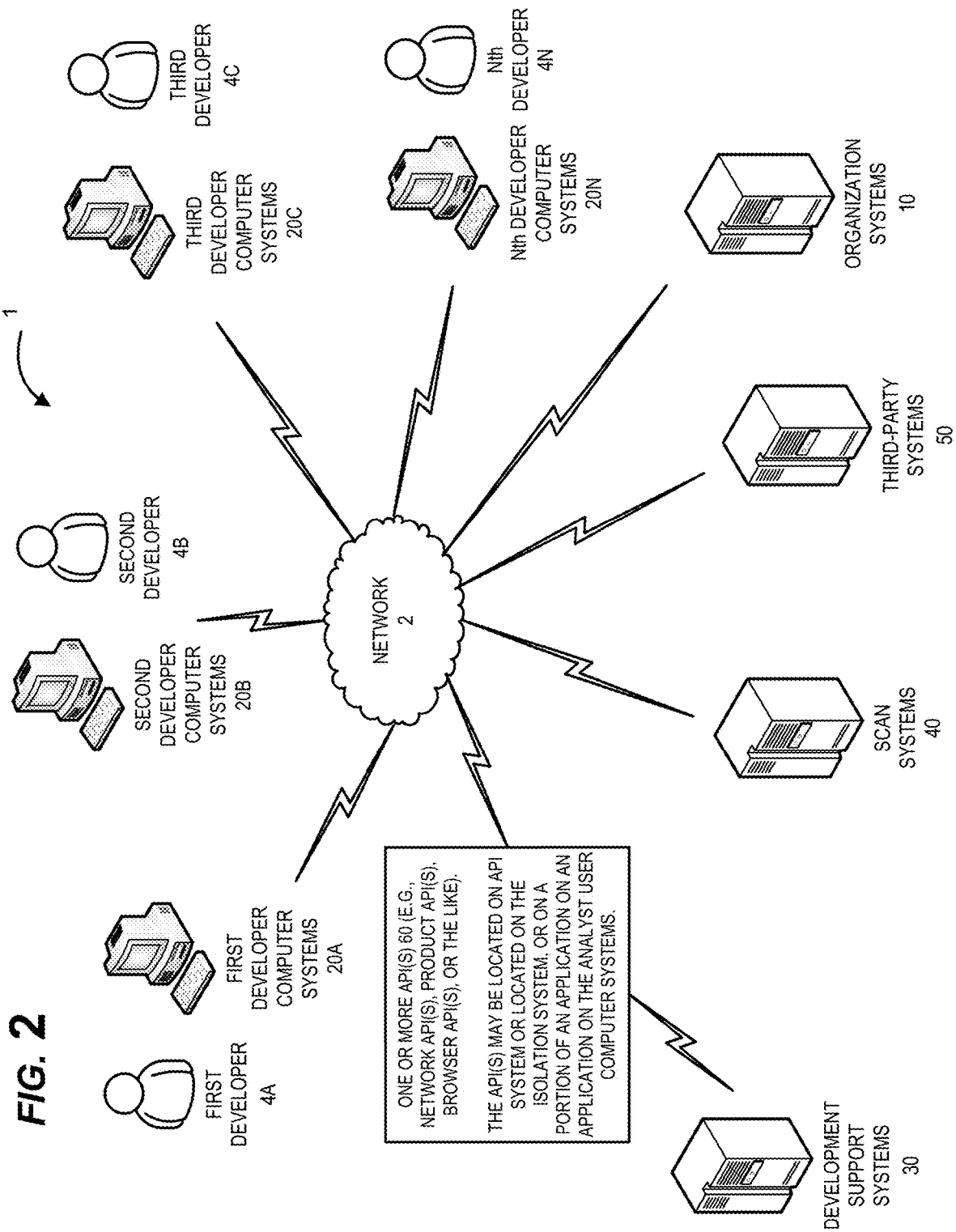

FIG. 2 illustrates a code development system environment network, in accordance with some embodiments of the present disclosure.

Figure 3:
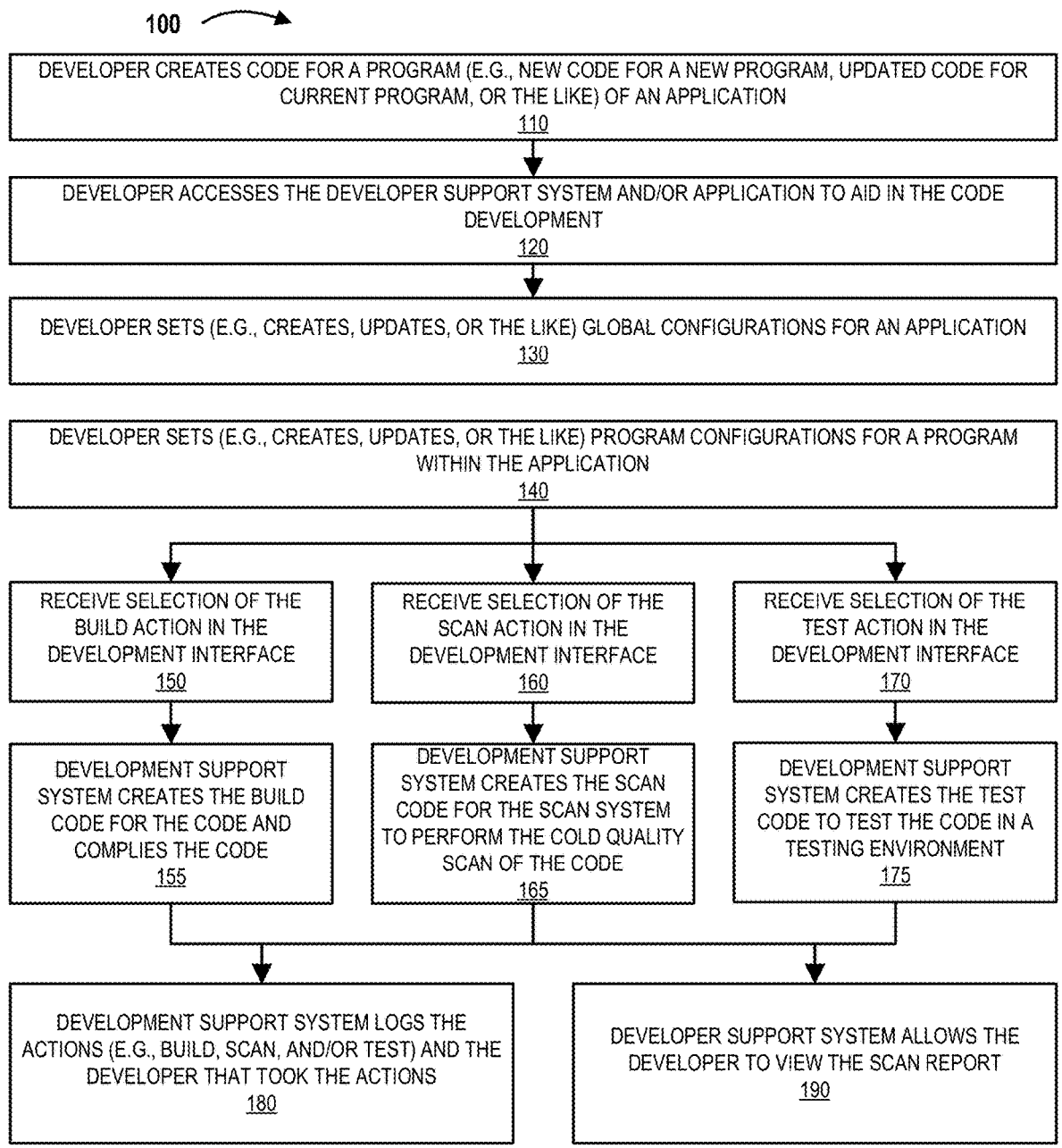

FIG. 3 illustrates a process flow for utilizing the code development system, in accordance with some embodiments of the present disclosure.

Figure 4:
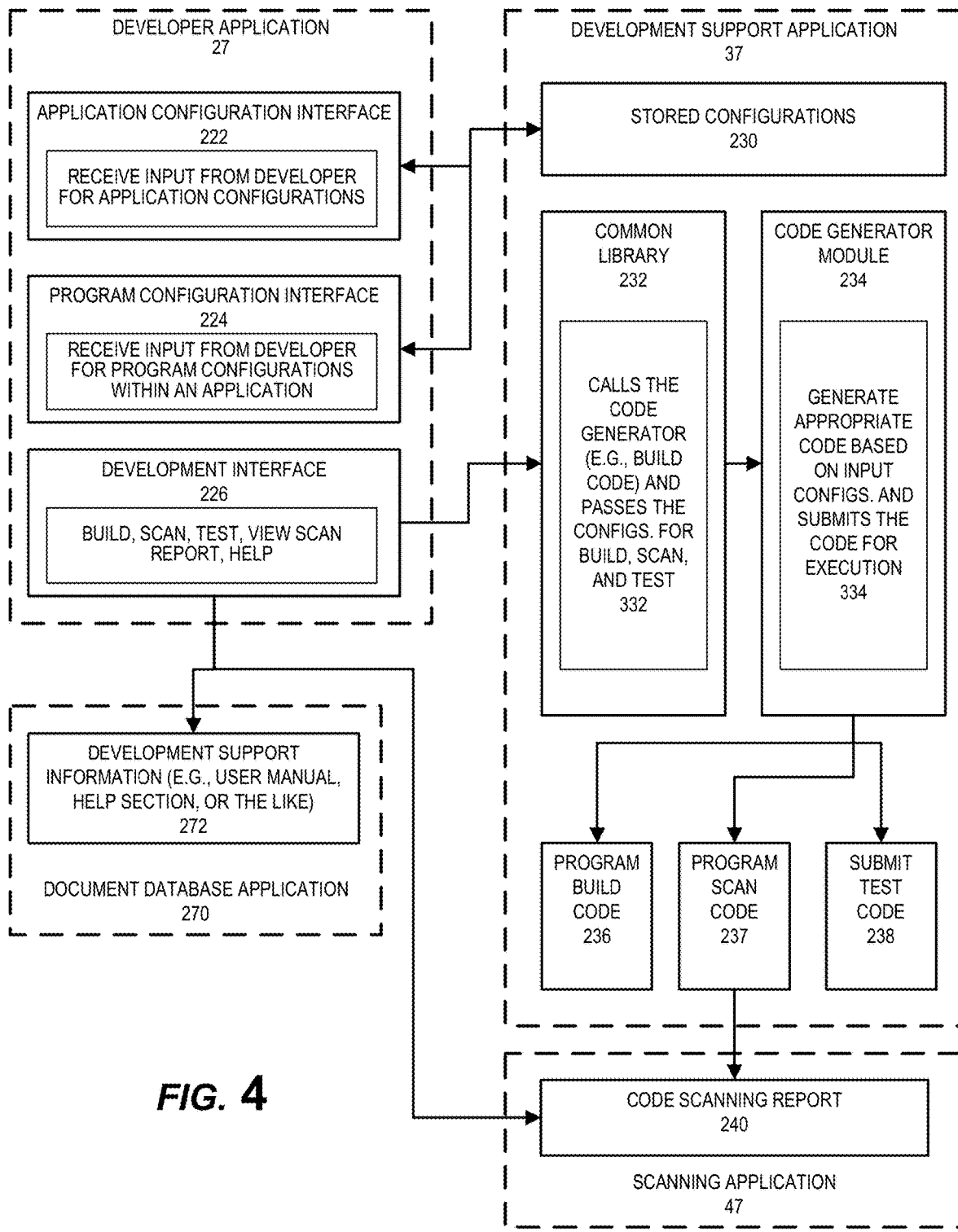

FIG. 4 illustrates an application communication flow diagram, in accordance with some embodiments of the present disclosure.

Figure 5:
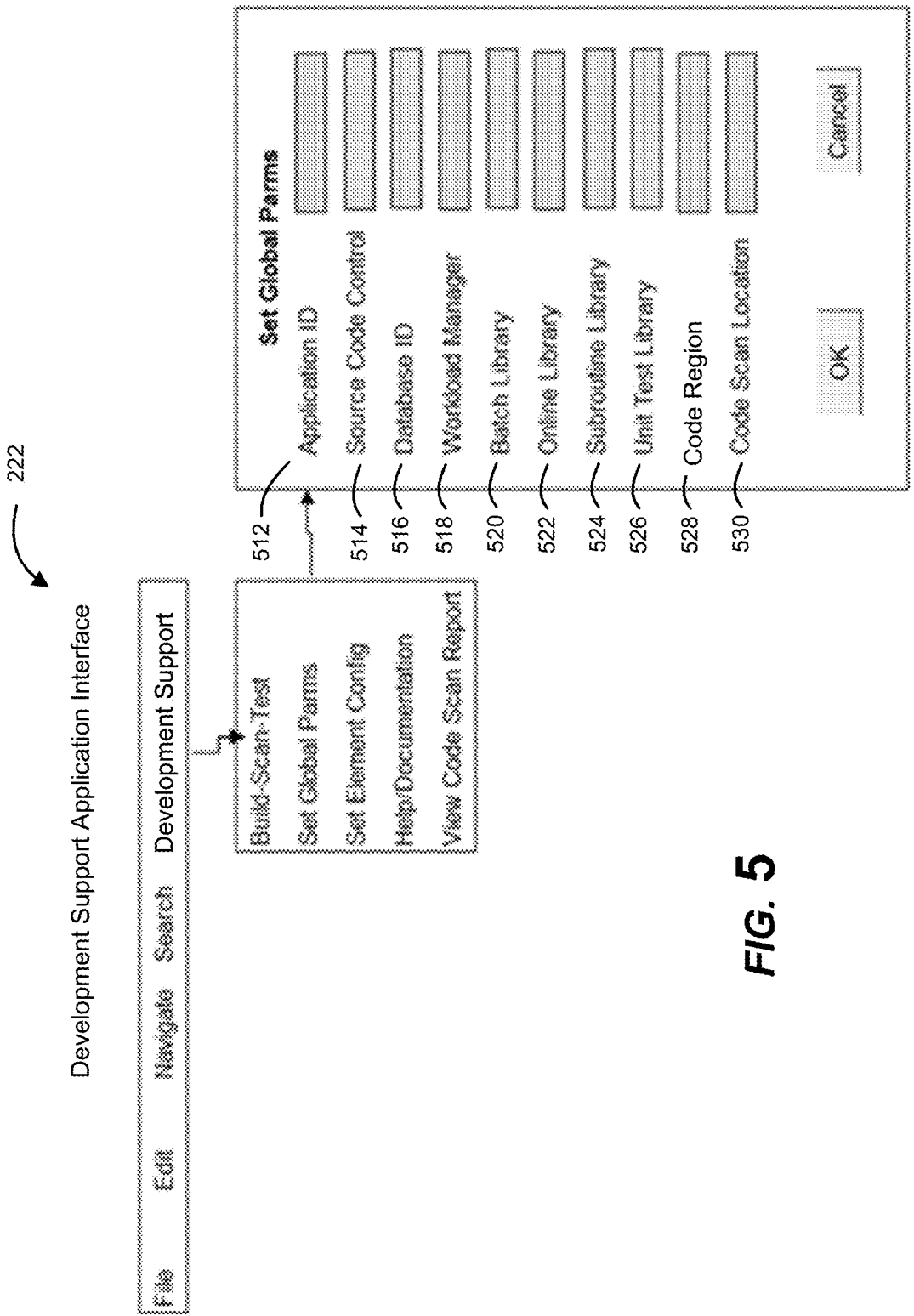

FIG. 5 illustrates an application configuration interface, in accordance with some embodiments of the present disclosure.

Figure 6:
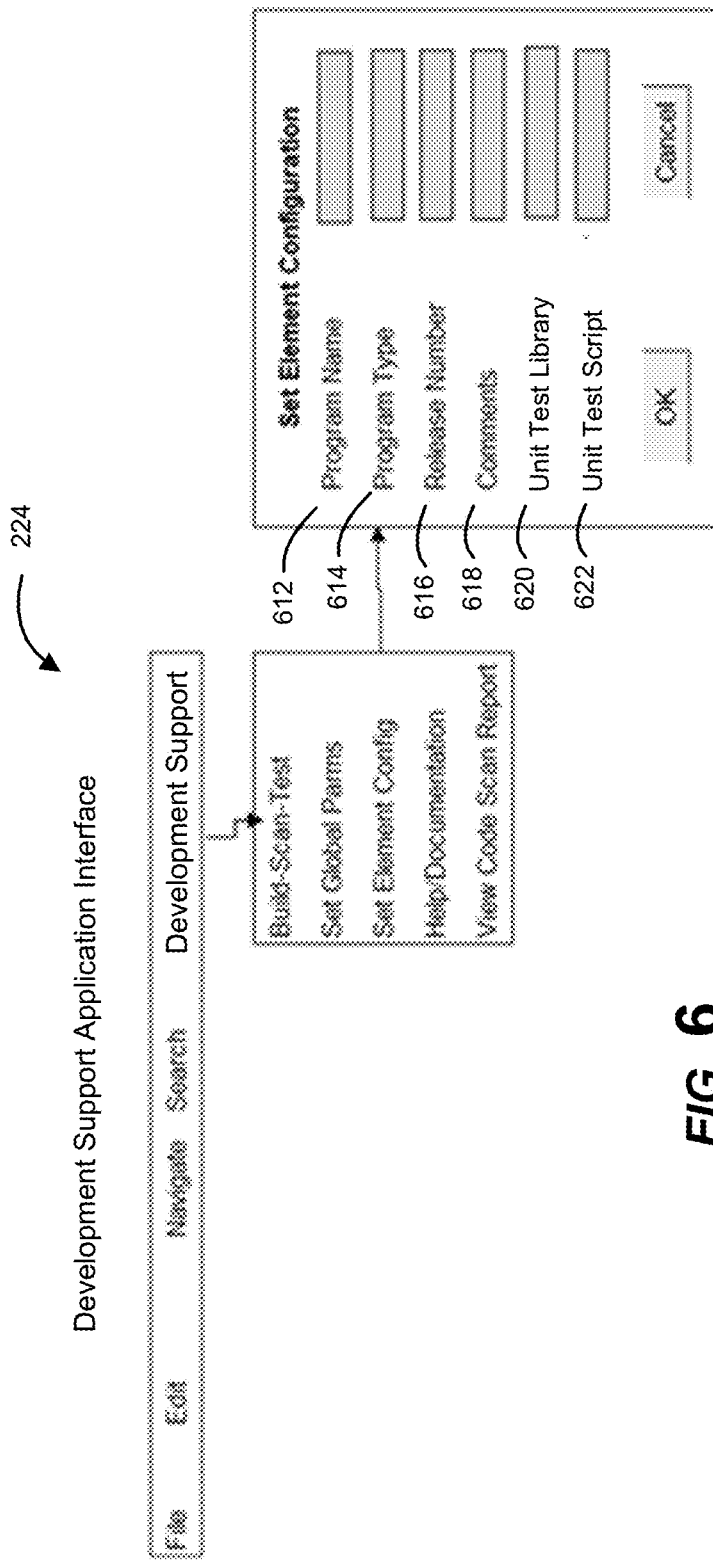

FIG. 6 illustrates a program configuration interface, in accordance with some embodiments of the present disclosure.

Figure 7:
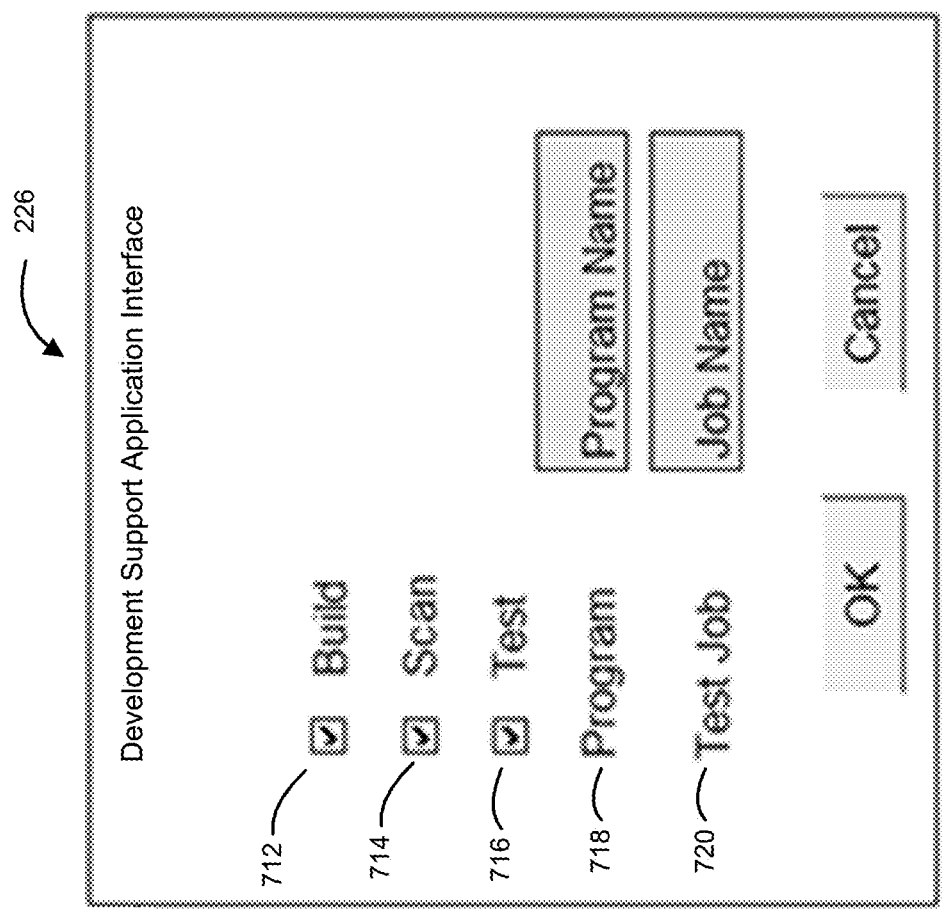

FIG. 7 illustrates a build, scan, test interface, in accordance with some embodiments of the present disclosure.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Generally, systems, computer products, and methods are described herein for providing support (e.g., assisting, or the like) in creating build code, scan code, and test code for source code based on stored application and program configurations. The configurations are set for the application and/or program for which the source code is developed, and the configurations indicate the various programs, applications, databases, third-party applications, or the like with which the source code may interface. During the build action, the system will create the build code to interface with various programs, applications, databases, third-party applications, or the like, and compile the code. During the scan action, the system will create the scan code to allow the source code to interface with the scanning application to check the quality of the code. During the test action the system will create the test code to allow execution within a test environment in which the code will operate.

FIG. 1 illustrates a block system diagram of a code development system environment 1, in accordance with embodiments of the present disclosure. As illustrated in FIG. 1, one or more organization systems 10 are operatively coupled, via a network 2, to one or more user computer systems 20 (e.g., developer computer systems, or the like), one or more development support systems 30 (e.g., development assistant systems 30, or the like), one or more scan systems 40 (or scanning systems 40), one or more third-party systems 40, and/or one or more other systems (not illustrated). In this way, the development support systems 30 (in coordination with the developer computer systems 20 and/or other systems on the network) may be utilized to aid in the development (e.g., creation, implementation, or the like) of code (e.g., source code, object code, executable code, or the like). For example, as will be described herein, a user 4 (e.g., a developer) may create at least a portion of the code (e.g., source code, or the like), then utilize the development support application 37 to aid in building the additional code (e.g., additional source code, object code, executable code, or the like) that allows the code developed by the developer to interface (e.g., communicate, or the like) with various programs, applications, databases, third-party applications, or the like. The development support application 37 may also be utilized to interface with a scan system 40 that may be utilized to determine any potential issues with the code created by the developer 4 (e.g., code quality check, or the like). Moreover, the development support application 37 may be utilized to execute the code to test the code within the environment in which the code will operate.

The network 2 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the one or more organization systems 10 generally comprise one or more communication components 12, one or more processing components 14, and one or more memory components 16. The one or more processing components 14 are operatively coupled to the one or more communication components 12 and the one or more memory components 16.

As used herein, the term "processing component" (otherwise described as a "processor," "processing device," or the like) generally includes circuitry used for implementing the communication and/or logic functions of a particular system. For example, a processing component may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components may include functionality to operate one or more software programs based on computer-readable instructions thereof, which may be stored in the one or more memory components.

A processing component may be configured to use a network interface to communicate with one or more other devices on the network 2. In this regard, the network interface may include an antenna operatively coupled to a transmitter and a receiver (together a "transceiver"). The processing component may be configured to provide signals to and receive signals from the transmitter and receiver, respectively. The signals may include signaling information in accordance with the air interface standard of the applicable cellular system of the wireless telephone network that may be part of the network 2. In this regard, the systems may be configured to operate with one or more air interface standards, communication protocols, modulation types, and access types. By way of illustration, the components may be configured to operate in accordance with any of a number of first, second, third, fourth, and/or fifth-generation communication protocols, and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The components may also be configured to operate in accordance with non-cellular communication mechanisms, such as via a wireless local area network (WLAN) or other communication/data networks.

The network interface may also include an application interface in order to allow an entity to execute some or all of the above-described processes. The application interface may have access to the hardware (e.g., the transceiver, and software previously described with respect to the network interface). Furthermore, the application interface may have the ability to connect to and communicate with an external data storage on a separate system within the network 2.

The communication components may have an interface that includes user output devices and/or input devices. The input and/or output devices may include a display (e.g., a liquid crystal display (LCD) or the like) and a speaker or other audio device, which are operatively coupled to the processing components. The input devices, which may allow the devices to receive data from a user, may further include any of a number of devices allowing the devices to receive data from a user, such as a keypad, keyboard, touch-screen, touchpad, microphone, mouse, joystick, other pointer device, button, soft key, and/or other input device(s). The communication components may further include an interface that accepts one or more network interface cards, ports for connection of network components, Universal Serial Bus (USB) connectors and the like.

As such, the one or more processing components 14 use the one or more communication components 12 to communicate with the network 2 and other components on the network 2, such as, but not limited to, the components of the one or more user computer systems 20, the one or more development support systems 30, the one or more scan systems 40, the one or more third-party systems 50, and/or the one or more other systems (not illustrated). As such, the one or more communication components 12 generally comprise a wireless transceiver, modem, server, electrical connection, electrical circuit, or other component for communicating with other components on the network 2 as described above.

As further illustrated in FIG. 1, the one or more organization systems 10 comprise computer-readable instructions 18 stored in the one or more memory components 16, which in some embodiments includes the computer-readable instructions 18 of the one or more organization applications 17 (e.g., website application, general application, specialized application, a portion of the foregoing, or the like). In some embodiments, the one or more memory components 16 include one or more data stores 19 for storing data related to the one or more organization systems 10, including, but not limited to, data created, accessed, and/or used by the one or more organization applications 17. The organization may be an entity that administers, controls, or regulates the network 2, user computer systems 20, the development support systems 30, and/or the scan systems 40. Moreover, the organization systems 10 may contain the organization applications 17, and programs thereof, that may have code being replaced and/or updated by the developer 4, as will be discussed in further detail herein. Moreover, it should be understood that the users 4 (e.g., developers 4, or the like), third-parties, and/or organizations described herein may all be referred to herein as entities.

As illustrated in FIG. 1, users 4 (e.g., developers 4, or the like) may communicate with each other and other systems over the network 2 as will be described in further detail herein. In some embodiments the users 4 may be individual users and/or employees, agents, representatives, officers, or the like of the organization on the network 2. As such, the user computer systems 20 (e.g., developer computer systems 20, or the like) may communicate with each other, the one or more organization systems 10, the one or more development support systems 30, the one or more scan systems 40, one or more third-party systems 50, and/or other systems (not illustrated). The one or more user computer systems 20 may be a desktop, laptop, tablet, mobile device (e.g., smartphone device, or other mobile device), or any other type of computer that generally comprises one or more communication components 22, one or more processing components 24, and one or more memory components 26.

The one or more processing components 24 are operatively coupled to the one or more communication components 22, and the one or more memory components 26. The one or more processing components 24 use the one or more communication components 22 to communicate with the network 2 and other components on the network 2, such as, but not limited to, the one or more organization systems 10, the one or more development support systems 30, the one or more scan systems 40, the one or more third-party systems 50, and/or the other systems (not illustrated). As such, as previously described herein, the one or more communication components 22 generally comprise a wireless transceiver, modem, server, electrical connection, or other component for communicating with other components on the network 2 and/or a keypad, keyboard, touch-screen, touchpad, microphone, mouse, joystick, other pointer component, button, soft key, and/or other input/output component(s) for communicating with the users 4.

As illustrated in FIG. 1, the one or more user computer systems 20 may have computer-readable instructions 28 stored in the one or more memory components 26, which in some embodiments includes the computer-readable instructions 28 for user applications 27, such as general applications, dedicated applications (e.g., apps, applet, or the like), portions of dedicated applications, a web browser or other apps that allow access to applications located on other systems, or the like. In some embodiments, the one or more memory components 26 include one or more data stores 29 for storing data related to the one or more user computer systems 20, including, but not limited to, data created, accessed, and/or used by the one or more user computer systems 20. The user application 27, in some embodiments, may be a portion of the development support application 37 that is located on the user computer systems 20. Alternatively, the user application 27 may be a browser that allows the user 4 to access the development support application 37. Alternatively or additionally, the user application 27 may be used to communicate with the one or more organization systems 10, one or more other user computer systems 20, the one or more development support systems 30, the one or more scan systems 40, the one or more third-party systems 50, and/or one or more other systems (not illustrated) in order to take the various actions through the development support systems 30 to aid in the development of code, as will be described in further detail herein.

As illustrated in FIG. 1, one or more development support systems 30 may be utilized by the one or more organization systems 10, the one or more user computer systems 20, the one or more scan systems 40, the one or more third party systems 50, and/or other systems to aid in allowing developers 4 to develop (e.g., create, build, scan, test, and/or the like) code.

As such, the one or more development support systems 30 are operatively coupled, via a network 2, to the one or more organization systems 10, the one or more user computer systems 20, the one or more scan systems 40, the one or more third-party systems 50, and/or the other systems (not illustrated). The one or more development support systems 30 generally comprise one or more communication components 32, one or more processing components 34, and one or more memory components 36.

The one or more processing components 34 are operatively coupled to the one or more communication components 32, and the one or more memory components 36. The one or more processing components 34 use the one or more communication components 32 to communicate with the network 2 and other components on the network 2, such as, but not limited to, the components of the one or more organization systems 10, the one or more user computer systems 20, the one or more scanning systems 40, the one or more third-party systems 50, and/or the one or more other systems (not illustrated). As such, the one or more communication components 32 generally comprise a wireless transceiver, modem, server, electrical connection, or other component for communicating with other components on the network 2 as previously described herein.

As illustrated in FIG. 1, the one or more development support systems 30 may have computer-readable instructions 38 stored in the one or more memory components 36, which in some embodiment includes the computer-readable instructions 38 of one or more development support applications 37. In some embodiments, the one or more memory components 36 include one or more data stores 39 for storing data related to the one or more development support systems 30, including, but not limited to, data created, accessed, and/or used by the one or more development support applications 37. The one or more development support applications 37 may allow for building, scanning, and/or testing of the code developed by a developer 4, as will be described herein.

As illustrated in FIG. 1, one or more scanning systems 40 may be utilized by the one or more organization systems 10, the one or more user computer systems 20, the one or more development support systems 30, the one or more third party systems 50, and/or other systems to aid in developing code. The scan systems 40, as will be described herein, will be utilized for scanning the code created by a developer 4 to determine any potential issues with the code (e.g., quality control check, or the like).

As such, the one or more scan systems 40 are operatively coupled, via a network 2, to the one or more organization systems 10, the one or more user computer systems 20, the one or more development support systems 30, the one or more third-party systems 50, and/or the other systems (not illustrated). The one or more scanning systems 40 generally comprise one or more communication components 42, one or more processing components 44, and one or more memory components 46.

The one or more processing components 44 are operatively coupled to the one or more communication components 42, and the one or more memory components 46. The one or more processing components 44 use the one or more communication components 42 to communicate with the network 2 and other components on the network 2, such as, but not limited to, the components of the one or more organization systems 10, the one or more user computer systems 20, the one or more development support systems 30, the one or more third-party systems 50, and/or the one or more other systems (not illustrated). As such, the one or more communication components 42 generally comprise a wireless transceiver, modem, server, electrical connection, or other component for communicating with other components on the network 2 as previously described herein.

As illustrated in FIG. 1, the one or more scanning systems 40 may have computer-readable instructions 48 stored in the one or more memory components 46, which in one embodiment includes the computer-readable instructions 48 of one or more scanning applications 47. In some embodiments, the one or more memory components 46 include one or more data stores 49 for storing data related to the one or more scan systems 40, including, but not limited to, data created, accessed, and/or used by the one or more scanning applications 47 (e.g., scan reports). The one or more scanning applications 47 may allow for performing a code quality scan of the code created by the developer 4 and/or through the build action, and the creations of a scan report for that a developer 4 may utilize to identify any issues in the code.

Moreover, as illustrated in FIG. 1, the one or more third-party systems 50 and/or other systems are operatively coupled to the one or more organization systems 10, the one or more user computer systems 20, the one or more development support systems 30, and/or the one or more scan systems 40, through the network 2. The one or more third-party systems 50 and/or other systems, have components the same as or similar to the components described with respect to the one or more organization systems 10, the one or more user computer systems 20, the one or more development systems 30, and/or one or more scan systems 40 (e.g., one or more communication components, one or more processing components, and one or more memory devices with computer-readable instructions of one or more third-party applications, one or more datastores, or the like). Thus, the one or more third-party systems 50 and/or other systems communicate with the one or more organization systems 10, the one or more user computer systems 20, the one or more development support systems 30, the one or more scan systems 40, and/or each other in same or similar way as previously described with respect to the one or more organization systems 10, the one or more user computer systems 20, the one or more development support systems 30, and/or the one or more scan systems 40. The one or more third-party systems 50 and/or other systems may comprise the systems that are authorized to communicate with other systems on the network 2 for various reasons, such as to communicate with the various organization applications 17 on the organization systems 10. The one or more other systems (not illustrated) may include the systems, and components thereof, for allowing communications between the systems (e.g., intermediaries to allow communication between the systems).

FIG. 2 illustrates a code development system environment 1 network, in accordance with embodiments of the present disclosure. As illustrated in FIG. 2, the network 2 illustrates that that one or more developers 4 (e.g., a first developer 4A, a second developer 4B, a third developer 4C, and Nth developers 4N) may use developer computer systems 20 (e.g., first developer computer systems 20A, second developer computer systems 20B, third developer computer systems 20C, and Nth developer computer systems 20N) to communicate over the network with the organization systems 10, development support systems 30, the scan systems 40, third-party systems 50 or other systems as previously described with respect to FIG. 1. In some embodiments, the developers 4 may communicate with the development support systems 30 to utilize the development support application 37 to build, scan, and test code as will be described in further detail herein. In some embodiments, as illustrated in FIG. 2, the developers 4 may communicate with the development support systems 30 through the use of one or more APIs 60. It should be understood that the one or more APIs 60 may be network APIs (e.g., operate on a development support network), product APIs (e.g., associated with the development support application 37), browser API(s) (e.g., to communicate with the development support systems 30), or the like. In some embodiments the API(s) may be located on an API system (not illustrated) that allows communication from systems on the network 2 to the development support system 30 located on or off the network 2. In some embodiments, the API(s) may be located within the development support systems 30 itself. In some embodiments the API(s), may be located on each developer computer systems 20, such that only the developers 4 operating the developer computer systems 20 are able to communicate with the development support systems 30.

In some embodiments, each developer 4 (e.g., a first developer 4A, a second developer 4B, a third developer 4C, and an Nth developer 4N) may have a the ability to set up specific configurations, such as application configurations and program configurations, in order to aid in implementing the build action, the scan action, and/or the test action for the code developed by each developer 4.

FIG. 3 illustrates a process flow for utilizing the code development system environment 1, in accordance with some embodiments of the present disclosure. Additionally, FIG. 4 illustrates an application communication flow diagram, and FIGS. 5 through 7 provide example embodiments of interfaces for the development support application 37, as will be described with respect to the process illustrated in FIG. 3.

As illustrated in block 110 of FIG. 3 the developer 4 may create the code (e.g., source code, or the like) for a program of an application. In some embodiments, the code created may be updated code for a program or may be new code for a program. Moreover, it should be understood that the code may be created in any type of language depending on the application and/or program thereof which will utilize the code developed by the developer 4. It should be further understood that the developer 4 may create the code using any type of application and/or system. Finally, the code may be developed outside of the development support application 37; however, in alternate embodiments of the invention, the code may be developed within the development support application 37.

FIG. 3 illustrates in block 120 that in some embodiments once the developer 4 creates the code, the developer 4 may access the development support application 37 in order to aid in the building, scanning, and/or testing of the code created by the developer 4. As previously discussed herein the developer 4 may access the development support application 37 through the developer's 4 own developer application 27 (e.g., portion of the development support application 37 located on the developer computer systems 30, a web browser of the developer computer systems 30, or the like).

As illustrated by block 130 of FIG. 3, the developer 4 may first set (e.g., create or update) application configurations for one or more applications in or with which the code will interface. In some embodiments the application configurations may be global configurations for a particular application, which may never, or rarely, change for each developer 4 setting the application configurations. For example, in some embodiments each developer 4 may be working on multiple applications and/or each application may have multiple developers 4 working on programs within the application, and thus, each developer 4 may set different application configurations for each application.

As illustrated in FIG. 4, the developer 4 may utilize the developer application 27 to access an application configuration interface 222. The application configuration interface 222 may be utilized by the developer 4 to enter input for the application configurations. FIG. 5 illustrates one embodiment of the application configuration interface 222. As illustrated in FIG. 5, a developer 4 may select to set global parameters (e.g., application configurations). In response, the developer may enter (e.g., key, select from a menu, select from a dropdown, drag and drop, or the like), an application ID 512, a source code control 514, database ID 516, workload manager 518, batch library 520, online library 522, subroutine library 524, unit test library 526, code region 528, and/or code scan location 530.

In some embodiments, a developer 4 may enter an application ID 512 into the application configuration interface 222. The development support application 37 will check if application configurations (e.g., global parameters) exists for the selected application ID 512. If application configurations already exist, the application configuration interface 222 may pre-populate the application configurations in the application configuration interface 222 for the particular developer 4 using the development support application 37, which the developer 4 may change. Alternatively, if the application configurations for the selected application ID 512 do not exist the developer 4 may enter the application configurations (e.g., global parameters) into the application configuration interface 222. The application configurations will be stored for each application and for each developer 4.

As illustrated in the application configuration interface 222, the application ID 512 may be a unique identifier for an application with which the code will operate. The application ID 512 can be used to segregate the results of builds of code based on the application to which the build relate, as well as to generate and log data on an application basis, as will be described in further detail herein. As also illustrated in the application configuration interface 222, the source code control 514 is an identifier for source code control repository. The source code control 514 is where the code (e.g., developer code) gets checked in as part of the build and a copy of the code is captured for the code quality scan (otherwise described as the "code quality check," or the like). The database ID 516 is a location identifier for the database which gets used for storing the code (e.g., build code) crated by the development support application 37 (e.g., control language, scripts, files, or the like) during the build action of the code created by the developer 4. The work load manager 518 illustrated in the application configuration interface 222 indicates the database work load manager that is used for the distribution of code created during the build action (e.g., build code). The batch library 520 is the destination for batch stored code created during the build action (e.g., build code). The online library 522 is the destination for online stored code created during the build action (e.g., build code). The subroutine library 524 is the destination for subroutine code created during the build action (e.g., build code). The application configuration interface 222 also includes a unit test library 526 that is the source of unit test code (e.g., test execution scripts, or the like). The build region 528 is an online region for distribution of application build code. The code scan location 530 is an identifier for the system (e.g., server) where scan reports (e.g., code quality scan reports, or the like) will be hosted. While specific types of application configurations have been described with respect to the application configuration interface 222, it should be understood that any type of application configurations may be set through the application configuration interface 222 depending on the type of application, the programming language, the systems (e.g., servers, mainframes, or the like) on which the application is hosted or with which the application interacts, or the like.

FIG. 3 further illustrates in block 140 that the developer 4 sets (e.g., creates, updates, or the like) program configurations for a program within the application. There may be one or more programs within each application (e.g., tens, hundreds, or the like number of programs). As such, not only may each developer 4 set individual application configurations, but each developer 4 may set individual program configurations for each program for which the developer 4 may be creating and/or changing code. As illustrated in FIG. 4 the developer 4 may utilize the developer application 27 to access a program configuration interface 224. The program configuration interface 224 may be utilized by the developer 4 to enter input for the program configurations. FIG. 6 illustrates one embodiment of the program configuration interface 224. As illustrated in FIG. 6, a developer 4 may select to set the program configurations (e.g., element configurations). In response, the developer 4 may enter (e.g., key, select from a menu, select from a dropdown, drag and drop, or the like) a program name 612, a program type 614, a release number 616, program comments 618, a unite test library 620, and a unit test member or script 622. When the developer 4 selects a program (e.g., a program name 612) the development support application 37 may determine if program configurations already exist. If program configurations already exist, the program configuration interface 224 may be populated with the current program configurations and allow the developer 4 to update the program configurations. If program configurations do not already exist the developer 4 may enter the program configurations through the program configuration interface 224. The program configurations will be stored for each program and for each developer 4 as set by each individual developer 4 for each program. In some embodiments the program configurations may be stored in each developer's storage directory (e.g., in the development support systems 30).

In some embodiments the program name 612 may comprise a program identifier in order to determine a program within or with which the code may function. The program type 614 may provide additional information about the program within or with which the code may function. The release number 616 may provide different versions of the same program in which the code may run (e.g., code for version 2.2 not 2.1 or 2.3, or the like). The program comments 618 allow a developer 4 to provide additional information related to the program and/or the code that the developer 4 has created for the program. The unit test library 620 is the source of unit test code for the specific program (e.g., test execution scripts, or the like). Finally, the unit test member or script 622 may be a location of at least a portion of the data within a dataset. While specific types of program configurations have been described with respect to the program configuration interface 224, it should be understood that any type of program configurations may be set through the program configuration interface 222 depending on the type of application, the programming language, the applications and/or the systems (e.g., servers, mainframes, or the like) on which the program is hosted or with which the program interacts, or the like.

As illustrated in FIG. 4, once the application configurations and/or the program configurations the are set (e.g., created, updated, or the like) the configurations are stored in the development support application 37 as stored configurations 230 (e.g., stored application configurations, stored program configurations, or the like).

As further illustrated by blocks 150, 160, and 170 of FIG. 3, the developer 4 may utilize the build action, scan action, and/or test action features of the development support application 37. For example, as illustrated in FIG. 4, a developer 4 may utilize a development interface 226 to implement a build action, scan action and/or test action. FIG. 7 illustrates on example embodiment of the development interface 226, in which the developer 4 may select the build action 712, the scan action 714, and/or the test action 716 for a specific program 718 and test job 720. The developer may select any one of the build action, the scan action, or the test action, or any combination thereof and select a feature (e.g., the "OK" button, or the like) to proceed with the one or more actions.

With respect to block 150 of FIG. 3, the development support application 37 may receive a selection from the developer 4 of the build action 712, which will create the build code and compile the code created by the developer in order to allow the code to be ready for testing. It should be understood that if the build action is not successful the development support application 37 may not move on to the scan action or test action. Moreover, the build action may be more than just compiling the code created by the developer 4. For example, the build action creates the build code that is used to interact with the programs, databases, systems, applications, or the like that were selected for the configurations (e.g., application configurations, program configurations, or the like). Without the development support application 37 described herein, the developer 4 would have to access multiple interfaces, create code, make selections, identify programs, databases, systems, applications, or the like in order to get the code created by the developer 4 ready for analysis in the scan action and/or for execution in the test action. The development support application 37 bypasses this requirement, and as such, improves the speed at which the code is developed (e.g., automatically creates additional code), reduces or eliminates errors (e.g., removes the potential for a developer to incorrect interface with other programs, databases, systems, applications), and creates the build code for unexperienced or unfamiliar developers 4 (e.g., developers 4 that are unexperienced and/or unfamiliar with certain programs, databases, systems, applications, or the like).

As illustrated in block 155 of FIG. 3, after the request for the build action is received, the build code is created and the code is compiled for execution. As illustrated in FIG. 4, the development support application 37 receives the request for the build action 712 from the developer application 27. The common library 232 (e.g., for executables, templates, or the like) receives the request for the build action 712, calls the code generator module 234 and passes the configurations (e.g., application configurations, program configurations, or the like) to the code generator module 234. The code generator module 234 generates the appropriate build code based on the configurations (e.g., application configurations, program configurations, or the like) and outputs the program build code 236 (e.g., code created by the developer and the build code). Moreover, the build action ID and build action name are outputted to a log as will described with respect to block 180, and a notification of completion of the build action is presented to the developer 4.

With respect to block 160 of FIG. 3, the development support application 37 receives a selection from the developer 4 for the scan action 714, which will create the scan code and communicate with the scan systems 40 in order to run the code quality scan to determine the quality of the code. The scan action 714 is used to determine if the code created by the developer and build code created during the build action 712 does not have any errors and/or follows best practices for the code. That is, the organization and/or each developer 4 may set the quality requirements (e.g., how the code should be developed) and when the code quality scan is performed by the scanning systems 40, the scanning systems 40 creates a scan report that may be provided to the developer 4 and/or stored to allow future access to the scan report (e.g., code quality scan report) by a developer 4.

As illustrated by block 165 in FIG. 3, in response to receiving a scan request, the development support application 37 creates the scan code (e.g., configuration file, pipeline, or the like) to communicate with the scanning application 47, converts the code from the program build 236 into the correct format, checks in the code into the scanning application 47, or the like in order to allow the scanning system 40 to run the code quality scan on the code. For example, as illustrated in FIG. 4, the common library 232 (e.g., for executables, templates, or the like) receives the request for the scan action 714 and calls the code generator module 234. The code generator module 234 generates the appropriate program scan code 237 and outputs the program scan code 237 (e.g., code to be analyzed) to the scanning systems 40. As illustrated in FIG. 4, the scanning application 47 runs the scan code 237 for the code quality scan and generates a code scan report 240. Moreover, the scan action ID and scan action name are outputted to a log as will be described with respect to block 180, and a notification of completion of the scan action is presented (e.g., displayed, sent, or the like) to the developer 4. As further illustrated block 190 in FIG. 3, the developer 4 uses the development support application 37 and/or the developer application 27 (or another application) to access the scan report 240. The developer 4 may review the scan report 240 in order to determine if the developer should make any changes to the code and/or the configurations selected. For example, the scan report may provide a quality check on the code (e.g., source code developed by the user and/or the additional code created to form the program build code). If there is an issue the developer 4 may revise the code and/or change the configurations before performing the build action and scan action again to determine if any issues remain in the code.

With respect to block 170 of FIG. 3, the development support application 37 may receive a selection from the developer 4 of the test action 716, which will create the test code to allow for execution of the program build code 236 and the calling of the data from the required locations. The test action is used to determine if the code (e.g., source code and build code) operates correctly in the environment in which the code will be utilized.

As illustrated in block 175 of FIG. 3, after the test action 716 request is received, the test code is created and submitted for execution. As illustrated in FIG. 4, the development support application 37 receives the request for the test action 716 from the developer application 27. The common library 232 (e.g., for executables, templates, or the like) receives the request for the test action 716, calls the code generator module 234. The code generator module 234 generates the appropriate test code and outputs the submission of the execution of the code (e.g., source code created by the developer 4 and the build code). Moreover, the test action ID and test action name are outputted to a log, and a notification of completion of the test action is presented to the developer 4. The developer 4 may review the program and application thereof to determine if the program and application works properly in the test environment.

As illustrated by the block 180 in FIG. 3, all of the actions taken by each developer 4 (e.g., build, scan, and/or test actions) and the results of each are stored in a log in order to track the usage of the development support application 37 and the effectiveness in reducing code development time, quantifying the reduction in the errors in coding, and the uniformity in best practices for particular programs and applications within the organization. Since each action is tracked by application, program, and developer 4 the system provides analytics related to the development on an application, program, and developer 4 level. The log may provide information related to time and day the developer support application 37 is used, the duration of use, the issued identified in the scan report, and/or the like in order to compare the information to traditionally coding duration and/or errors, or the like.

As further illustrated in FIG. 4, the code development system may further include a document database application 270 with documents 272 (e.g., user manuals, help sections, or the like) that the developer 4 may access in order to aid in utilizing the development support application 37. The document database application 270 may be located on the developer support systems 30, or may be located on other systems on the network 2.

As discussed herein the code development system, and in particular the developer support application 37, reads the configurations, validates the configurations, reads the executables and/or templates from the common library, substitutes the variables in the templates based on the selected configurations, writes the code (e.g., build code, scan code, and/or test code) for the action (e.g., build action, scan action, and/or test action) based on the code developed by the developer 4 and the configurations, and runs the selected action(s) automatically. Thereafter, the action(s) are captured and logged (e.g., using a logger template for tracking the development of the code by the developer for the program within the application).

When creating code for a program of an application, after the developer 4 creates the source code, the developer 4 typically is required to access numerous other screens (e.g., 10, 15, 20, 25, 35, 45, 50 interfaces or the like) and/or make numerous entries (e.g., 2, 5, 10, 15, 25, 50, 75, or the like entries) on each screen, such as creating additional code, in order to allow the source code to communicate properly with the desired programs, databases, systems, applications, or the like. The development support application 37 removes the requirements for the developers 4 to create this additional code. Consequently, as previously described herein, the code development system provides improved speed at which the code is developed because the developer is not required to know of and/or develop code for interfacing with, all of the programs, databases, systems, applications, or the like with which the source code may interface. Furthermore, since the development of the build code, scan code, and/or test code are standardized for each developer, program, and/or application, the code development system reduces or eliminates errors in the build code, scan code, and/or test code. That is, the code development system removes the potential for a developer 4 to incorrectly interface with other programs, databases, systems, applications not related to the source code developed by the developer 4. Moreover, the code development system allows more inexperienced developers to create build code, scan code, and/or test code on the same level as more experienced developers 4 because the coding for the build action, scan action, and/or test action are standardized across all developers 4 and/or occurs automatically based on best practices required by the organization.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, COBOL, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for aiding in development of code, the system comprising:
   one or more memory devices storing computer-readable code; and
   one or more processing devices operatively coupled to the one or more memory devices, wherein the one or more processing devices are configured to execute the computer-readable code to:
      receive a selection for a build action, a scan action, or a test action of the code for a program for an application;
      generate build code for the build action, scan code for the scan action, or test code for the test action based on pre-selected configurations and the selection of the build action, the scan action, or the test action, wherein the pre-selected configurations at least comprise:
         application configurations for the code, wherein the application configurations set global parameters for the code developed for the application; and
         program configurations for the code, wherein the program configurations set program parameters for the code developed for the program within the application, and wherein the program configurations are specific to individual developers; and
      send a notification of completion or error for the build action, the scan action, or the test action;
      wherein the build code for the build action allows for communication of the code with the program and the application;
      wherein the scan code for the scan action allows for a code quality scan of the code for potential code issues; and
      wherein the test code for the test action allows for execution of the code for testing.

2. The system of claim 1, wherein the one or more processing devices are configured to execute the computer-readable code to:
   receive a selection from a developer of the code for the build action, the scan action, or the test action.

3. The system of claim 1, wherein receiving the selection for the build action, the scan action, or the test action comprises receiving the selection for the build action, the scan action, and the test action.

4. The system of claim 1, wherein the one or more processing devices are configured to execute the computer-readable code to:
   receive the application configurations for the code.

5. The system of claim 1, wherein the one or more processing devices are configured to execute the computer-readable code to:
   receive the program configurations for the code.

6. The system of claim 1, wherein the application configurations include global application configurations for all developers and developer application configurations specific to the individual developers on the system.

7. The system of claim 1, wherein the one or more processing devices are configured to execute the computer-readable code to:
   process the build action by receiving the pre-selected configurations and generating the build code for the build action, and
   utilize the build code to compile the code for preparation for execution.

8. The system of claim 1, wherein the one or more processing devices are configured to execute the computer-readable code to:
   process the scan action by receiving the pre-selected configurations and generating the scan code for the scan action; and
   utilize the scan code to automatically allow a scan system to perform the code quality scan on the code.

9. The system of claim 1, wherein the one or more processing devices are configured to execute the computer-readable code to:
   process the test action by receiving the pre-selected configurations and generating the test code for the test action; and
   utilize the test code to automatically execute the code in a testing environment.

10. The system of claim 1, wherein the one or more processing devices are configured to execute the computer-readable code to:
    log results of the build action, the scan action, or the test action.

11. The system of claim 10, wherein the log comprises a date, a time, an application identifier, a program identifier, a developer identifier, or an indication of completion or incompletion in the build action, the scan action, or the test action.

12. The system of claim 1, wherein the one or more processing devices are configured to execute the computer-readable code to:
    receive a selection to view a scan report; and
    provide the scan report to a developer on a developer computer system.

13. The system of claim 1, wherein the code is source code created by a developer, and the build code comprises at least an executable file for the source code.

14. A method for aiding in development of code, the method comprising:
    receiving, by one or more processor components, a selection for a build action, a scan action, or a test action of the code for a program for an application;
    generating, by the one or more processor components, build code for the build action, scan code for the scan action, or test code for the test action based on pre-selected configurations and the selection of the build action, the scan action, or the test action, wherein the pre-selected configurations at least comprise:
       application configurations for the code, wherein the application configurations set global parameters for the code developed for the application; and
       program configurations for the code, wherein the program configurations set program parameters for the code developed for the program within the application, and wherein the program configurations are specific to individual developers; and sending, by the one or more processor components, a notification of completion or error for the build action, the scan action, or the test action;

wherein the build code for the build action allows for communication of the code with the program and the application;

wherein the scan code for the scan action allows for a code quality scan of the code for potential code issues; and wherein the test code for the test action allows for execution of the code for testing.

15. The method of claim 14, further comprising:

receiving a selection from a developer of the code for the build action, the scan action, or the test action.

16. The method of claim 14, wherein receiving the selection for the build action, the scan action, or the test action comprises receiving the selection for the build action, the scan action, and the test action.

17. The method of claim 14, wherein the method further comprises:

receiving the application configurations for the code.

18. The method of claim 14, wherein the method further comprises:

receiving the program configurations for the code.

19. The method of claim 14, further comprising:

logging results of the build action, the scan action, or the test action.

20. A computer program product for aiding in development of code, the computer program product comprising at least one non-transitory computer-readable medium having computer-readable program code portions embodied therein, the computer-readable program code portions comprising:

an executable portion configured to receive a selection for a build action, a scan action, or a test action of the code for a program for an application;

an executable portion configured to generate build code for the build action, scan code for the scan action, or test code for the test action based on pre-selected configurations and the selection of the build action, the scan action, or the test action, wherein the pre-selected configurations at least comprise:

application configurations for the code, wherein the application configurations set global parameters for the code developed for the application; and program configurations for the code, wherein the program configurations set program parameters for the code developed for the program within the application, and wherein the program configurations are specific to individual developers; and an executable portion configured to send a notification of completion or error for the build action, the scan action, or the test action;

wherein the build code for the build action allows for communication of the code with the program and the application;

wherein the scan code for the scan action allows for a code quality scan of the code for potential code issues; and wherein the test code for the test action allows for execution of the code for testing.

\* \* \* \* \*